June 4, 1929.  H. S. GANO  1,715,750
CONTROL SYSTEM
Filed Aug. 13, 1927
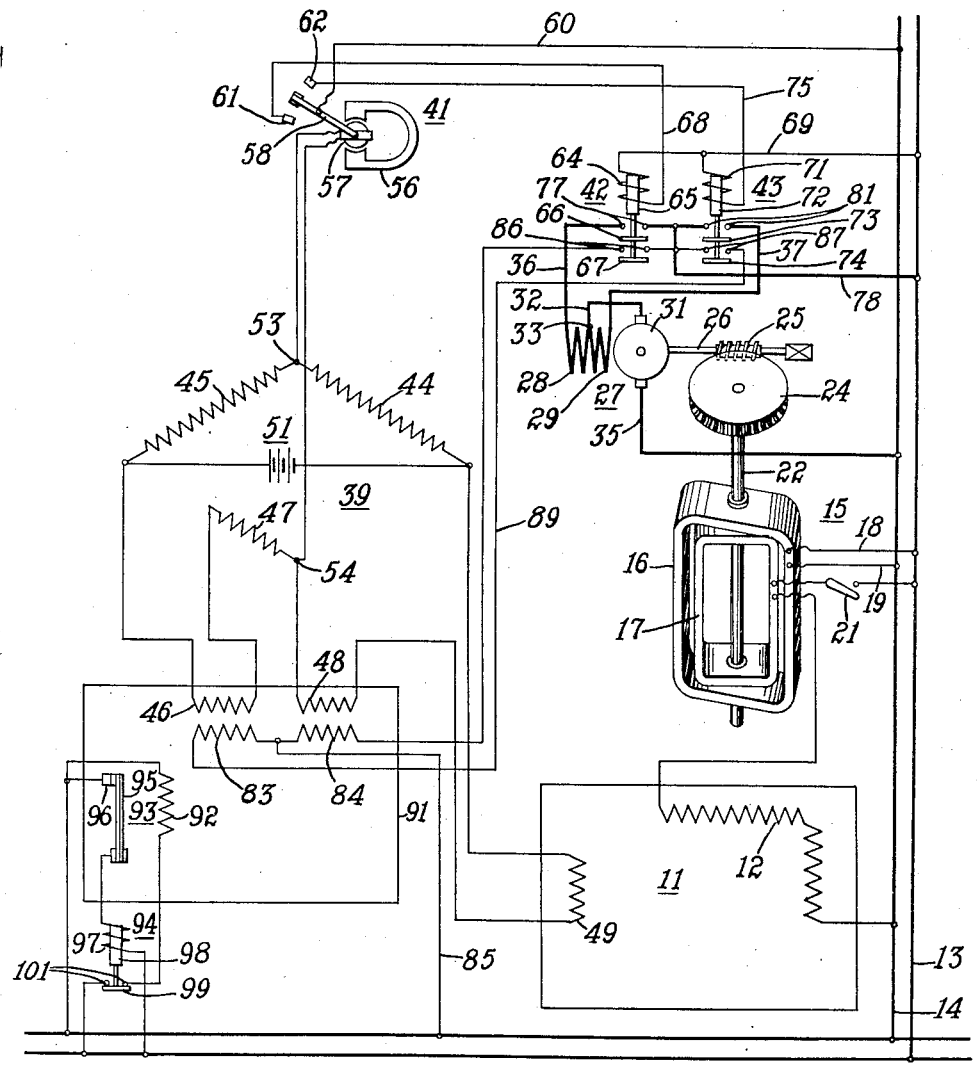
INVENTOR
Harlan S. Gano
BY
Wesley S. Carr
ATTORNEY Patented June 4, 1929.

1,715,750

UNITED STATES PATENT OFFICE.

HARLAN S. GANO, OF MANSFIELD, OHIO, ASSIGNOR TO WESTINGHOUSE ELECTRIC & MANUFACTURING COMPANY, A CORPORATION OF PENNSYLVANIA.

CONTROL SYSTEM.

Application filed August 13, 1927. Serial No. 212,693.

My invention relates to control systems and particularly to anti-hunt control systems.

An object of my invention is to provide a control system that shall be operable to maintain a condition to be controlled substantially constant.

A further object of my invention is to provide a control system that shall be operable to maintain a substantially constant average condition without causing overshooting or undershooting of said condition.

And a still further object of my invention is to provide a control system that shall be simple in construction, efficient in its operation and easily installed.

In practicing my invention, I provide an energy-consuming device, means for supplying energy to the device in variable quantities and means for so controlling the energy-supplying means, in accordance with an average condition to be maintained in the device, that overshooting and undershooting, commonly known as hunting, of said average condition may be substantially avoided.

For a fuller understanding of my invention, reference may be had to the following description taken in conjunction with the accompanying drawings in which the single figure is a schematic illustration of circuits and apparatus embodying my invention.

In the drawings, an energy-consuming device comprises a body 11 and a resistor 12 for heating the body. The resistor 12 may be connected for energization to electric-energy-supply conductors 13 and 14.

In order that the energy input to the resistor, may be varied, a voltage regulator 15 of the induction type is provided. The regulator comprises a primary coil 16 and a secondary coil 17 inductively coupled thereto, the coils being movable relatively to each other in order that the inductive coupling therebetween may be varied.

As shown, the primary coil 16 is connected to the supply conductors 13 and 14 by means of conductors 18 and 19, and the secondary coil 17 is connected in series with the resistor 12 across the supply conductors 13 and 14. A switch 21 is provided whereby the secondary coil may be disconnected from the supply conductors.

The secondary coil 17 may, for explanatory purposes, be considered as the movable coil and may be located within the coil 16. In order that the coil 17 may be turned on its longitudinal axis to thereby vary the inductive coupling between the coils, a shaft is provided that extends through the longitudinal axis of the coils, the secondary coil being secured thereto.

One end of the shaft 22 may be provided with a worm wheel 24 that meshes with a worm pinion 25 secured to a shaft 26.

The shaft 26 may be rotated by means of a motor 27 that is mechanically connected thereto. If the motor is caused to rotate the shaft in one direction, the coil 17 will be turned to such a position that the voltage impressed across the resistor 12 will be increased and, if rotated in the opposite direction, the coil 17 will be turned to such position that the voltage will be lowered.

The motor 27 comprises field windings 28 and 29 and an armature 31 having a terminal 32 thereof connected at 33 to opposite and connected terminals of the field windings. A terminal or brush 35 of the motor may be connected to the supply conductor 14.

The field windings are so arranged that, if a terminal 36 of the winding 28 is connected to the supply conductor 13, the motor 27 will rotate in one direction and, if terminal 37 of the winding 29 is connected to the same conductor, the motor will rotate in the opposite direction.

In order that the direction of rotation of the motor 27 may be so controlled that the voltage impressed across the resistor 12 shall be of the proper value to maintain a substantially constant thermal condition in the body 11, a Wheatstone bridge 39, a control instrument 41 and relays 42 and 43 are provided, the relays being operable to selectively control the energization of the field winding and hence the direction of rotation of the motor armature.

The Wheatstone bridge comprises resistors 44, 45, 46, 47, 48 and 49 connected to form the well known Wheatstone bridge circuit. The bridge is provided with a source of electro-motive force 51 that is connected to the junction points of the resistors 45 and 46, and 44 and 49, respectively.

It is preferred that the resistors 44 and 45 have a substantially zero temperature coefficient of resistance so that changes in ambient temperature may not disturb the resistance balance of the bridge.

In order that the resistance balance of the Wheatstone bridge 39 may be varied in accordance with the temperature of the body 11, the resistor 49 is located within the body, it being understood that the resistor 49 possesses a temperature coefficient of resistance.

If the temperature of the body 11 increases, the resistance of the resistor 49 increases also, thereby causing the polarity of terminals 53 and 54 of the bridge to change and the voltage therebetween to vary the variation in voltage being substantially in proportion to the change in temperature in the body 11.

The instrument 41 comprises a permanent magnet 56, a movable coil 57, a movable contact arm 58 carried thereby and connected to the conductor 14 by a conductor 60, and stationary contacts 61 and 62 located in the path of movement of the movable contact arm 58. The terminals of the coil 57 may be connected to the galvanometer points 53 and 54 of the bridge 39 in order that the coil may be actuated in accordance with the difference of potential existing therebetween.

The relay 42 comprises a coil 64, an armature 65 and contact-bridging members 66 and 67 carried by the armature. One terminal of the coil 64 is connected to the stationary contact 61 by a conductor 68 and the other terminal thereof is connected to the supply conductor 13 by a conductor 69.

The relay 43 comprises a coil 71, an armature 72 and contact-bridging members 73 and 74 carried by the armature. One terminal of the coil 71 is connected to the stationary contact 62 by means of a conductor 75, and the other terminal thereof is connected to the conductor 69.

When the temperature of the body 11 is below a predetermined value, the polarity and the potential difference between points 53 and 54 of the Wheatstone bridge are such that the movable contact arm 58 engages the stationary contact 61, thereby causing the relay 42 to be energized and the contact-bridging member 66 thereof to engage a pair of stationary contacts 77 located in the motor circuit. The motor 27 is thereby energized, the energizing circuit extending from supply conductor 13 through a conductor 78, contact-bridging member 66, conductor 36, field winding 28, and the armature 31 to the supply conductor 14.

The motor being thus energized, the coil 17 of the voltage regulator will be caused to turn until the voltage impressed on the resistor 12 has been increased to such value that the temperature of the region of the body 11 will have been heated to a temperature of a predetermined value. The temperature of the body 11 having been raised, the resistance of the resistor 49 will increase to such value that the movable contact 58 is actuated into engagement with the stationary contact 62, thereby effecting deenergization of the relay 42 and energization of the relay 43.

When the relay 43 has been energized, an energizing circuit for the motor 27 will be established from the supply conductor 13 through the conductor 78, contact-bridging member 73, stationary contacts 81, conductor 37, field winding 29 and armature 31 to the supply conductor 14. The direction of rotation of the motor 27 will then be reversed to effect a lowering of the voltage impressed on the resistor 12, with a consequent reduction in temperature of the body 11. As the temperature of the body 11 decreases, the resistance of the resistor 49 decreases substantially in proportion to effect an unbalance of the bridge 39 in such direction that reengagement of the movable contact 58 and the stationary contact 61 is again effected. The relay 42 being energized, the voltage impressed on the resistor 12 will be again increased, as hereinbefore set forth.

Since the temperature of the resistor 49 lags behind that of the body 11 as it increases and decreases, the result is that the temperature of the body 11 will vary between relatively high and low values, thereby producing an average temperature within the body from which the minimum and maximum temperatures depart quite widely.

In order to prevent wide variations in temperature within the body 11, it is desirable to increase the voltage by a relatively small amount if the temperature of the body 11 is below the average value to be maintained therein, so that the temperature of the body will gradually rise to or slightly above the average value to be maintained. It is also desirable, if the temperature is above the average temperature to be maintained, to lower the voltage impressed on the resistor 12 a relatively slight amount in order that the temperature within the body 11 shall slowly fall to or slightly below the average value to be maintained.

In order that the voltage regulator 15 may not be actuated to produce wide variations in voltage in response to temperature changes in the body 11, means are provided whereby an unbalance of the bridge 39, effected by the resistor 49, in one direction, may be counter-balanced by an unbalance of the bridge 39 in the opposite direction. This may be accomplished by providing resistor elements 83 and 84 for heating the resistors 46 and 48 when the one or the other of the relays 42 and 43 is energized.

Adjacent terminals of the resistors 83 and 84 may be connected to the supply conductor 14 by means of a conductor 85, and the opposite terminals thereof may be connected to stationary contacts 86 and 87 of the relays 42 and 43, respectively.

When the relay 42 is energized, as a result of a decrease in resistance of the resistor 49, the resistor 84 is energized from the supply conductors 13 and 14, the energizing circuit being from supply conductor 13 through conductor 78, contact-bridging member 67, stationary contacts 86 and resistor 84 to the supply conductor 14. Upon energization of the resistor 84, the temperature of the resistor 48 is caused to increase and to cause the Wheatstone bridge 39 to become unbalanced in such direction that the movable contact 58 is caused to engage the stationary contact 62 slightly in advance of the temperature obtaining within the body 11, which would normally be required if the resistor 49 only were effective to cause such an unbalance in the resistance of the bridge. Thus, the temperature of the body 11 is prevented from rising too high above the average temperature to be maintained in the body.

If now, the relay 43 is energized when contact is made between the movable contact 58 and the stationary contact 62, the resistor 83 is connected, for energization, to the supply conductors 13 and 14, the energizing circuit being from the supply conductor 13 through the conductor 78, contact-bridging member 74, stationary contacts 87, conductor 89, resistor 83 and the conductor 85 to the supply conductor 14. Thus, the resistor 46 is caused to be heated to such value that the change in resistance thereof causes the bridge 39 to approach a balanced condition and to effect disengagement of the contacts 58 and 62 and denergization of the relay 43. Thus, the voltage impressed on the resistor 12 is prevented from being lowered to such extent that the temperature of the body 11 falls too far below the average temperature.

Thus it is seen that, if the resistance of the bridge 39 is unbalanced by a change in resistance of the resistor 49 to such extent that the relays 42 or 43 are caused to be energized, the heating elements 83 and 84 will become effective to restore the balance of the bridge and to thereby cause the energy input to the resistor 12 to be varied by moderate amounts, with the result that a uniform average temperature may be maintained in the body 11.

In order that ambient temperatures may not affect the resistance of the resistance elements 46 and 48, the elements may be located within a casing 91 that is provided with a thermostatically controlled heater 92. The heater 92 is controlled by means of a thermostat 93 and a relay 94.

The thermostat 93 comprises a bimetallic member 95 and a cooperating stationary contact member 96.

The relay 94 comprises a coil 97, an armature 98, a contact-bridging member 99 and cooperating stationary contacts 101. When the thermostat 93 is in the circuit-controlling position shown in the drawings, the coil 97 is energized to effect engagement between the contact-bridging member 99 and the stationary contact 101, thereby establishing an energizing circuit from the energy-supply conductors 13 and 14. If the temperature of the casing 91 increases above a predetermined value, the bimetallic member 95 is caused to deflect to such position that the energizing circuit of the relay 94 is broken, thereby effecting deenergization of the resistor 92. As the temperature of the casing falls below a predetermined value, the thermostat 93 assumes the position shown in the drawings and the energizing circuit for the resistor 92 is again established. Thus, it is seen that, by intermittently energizing and deenergizing the resistor 92, the temperature of the casing 91 may be maintained substantially constant.

By my invention, I have provided means for so controlling the temperature of a body to be heated that the temperature thereof does not depart widely from an average temperature to be maintained.

Various modifications may be made in the device embodying my invention without departing from the spirit and scope thereof. I desire, therefore, that only such limitations shall be placed thereon as are imposed by the prior art and the appended claims.

I claim as my invention:

1. The combination with a motor and a plurality of relays for controlling the direction of rotation of said motor, of a plurality of resistor members connected in a Wheatstone-bridge circuit, one of said resistors being responsive to temperature changes of a body for effecting an unbalance of the bridge circuit in one direction, means connected to the galvanometer points of said bridge for selectively energizing said relays in accordance with the direction of unbalance of said bridge circuit, and means responsive to the energization of the relays energized for effecting an unbalance of the bridge in another direction.

2. The combination with a plurality of relays, and an electro-responsive circuit-controlling instrument for selectively energizing said relays, of a plurality of resistor elements connected in a Wheatstone-bridge circuit, one of said resistor elements being responsive to the temperature of a body to be controlled for effecting an unbalance of the bridge, and heating means energized upon the selective energization of the relays for effecting a temperature change in other of said resistor elements to cause an unbalance thereof in opposition to the unbalance produced by the resistor subjected to the temperature of the body.

3. In combination, a plurality of resistor elements connected to form a Wheatstone-bridge circuit, a source of electromotive force therefor, one of said resistor elements being subjected to the temperature of a body to be controlled thereby, an electro-responsive circuit-controlling instrument connected to the galvanometer points of said bridge, said instrument being actuable in accordance with changes in the resistance of said resistor element, a relay connected to said instrument and controlled thereby, and heating means energized upon the energization of said relay for increasing the resistance of said resistor elements to effect a balance of said bridge and a deenergization of said relay.

4. In combination, a plurality of resistor elements connected to form a Wheatstone-bridge circuit, one of said resistor elements having a temperature coefficient of resistance, electro-responsive means energized in response to a change in the resistance balance of said bridge, and means controlled by said electro-responsive means and embodying heating elements selectively affecting other of said resistor elements for effecting a change in the balance of said bridge in opposition to said first named change.

5. A temperature-control system comprising a plurality of resistor elements connected to form a Wheatstone-bridge circuit, one of said resistor elements having a temperature coefficient of resistance and being subjected to a temperature to be controlled, a contact-making member, an actuating coil therefor connected to the galvanometer points of said bridge, said coil being energized in response to a change in resistance of said resistor element, and heating means operatively associated with other of said resistor elements and selectively energized in accordance with the position of said contact-making member for preventing hunting of said system.

6. In combination, a plurality of resistors connected to form a Wheatstone-bridge circuit, one of said resistors having a temperature coefficient of resistance, a source of electromotive force for said bridge, a relay, a circuit-controlling device connected to the galvanometer points of said bridge for controlling said relay in response to an unbalance in the resistance of said bridge and heating means controlled by said relay and thermally associated with another of said resistors tending to restore the resistance balance of said bridge.

7. In combination, a plurality of resistors connected to form a Wheatstone-bridge circuit, a source of electromotive force therefor, a plurality of relays, a circuit-controlling device connected to the galvanometer points of said bridge for selectively controlling said relays in accordance with the direction and change in the resistance balance of said bridge, and heating means thermally associated with said resistors and selectively energized by said relays for counterbalancing said change in resistance balance.

In testimony whereof, I have hereunto subscribed my name this 1st day of August, 1927.

HARLAN S. GANO.